United States Patent [19]
Goss et al.

[11] Patent Number: 5,788,268
[45] Date of Patent: *Aug. 4, 1998

[54] SPRING RETAINER AIR BAG MOUNTING DEVICE

[75] Inventors: David C. Goss, Rockford; Steve P. Donovan, Roscoe, both of Ill.

[73] Assignee: Textron Inc., Providence, R.I.

[ * ] Notice: The term of this patent shall not extend beyond the expiration date of Pat. No. 5,599,039.

[21] Appl. No.: 667,084

[22] Filed: Jun. 20, 1996

Related U.S. Application Data

[63] Continuation-in-part of Ser. No. 505,399, Jul. 21, 1995, Pat. No. 5,599,039.
[51] Int. Cl.⁶ ..................................................... B60R 21/16
[52] U.S. Cl. ........................................ 280/728.2; 280/721
[58] Field of Search ............................ 280/728.2, 731

[56] References Cited

U.S. PATENT DOCUMENTS

| | | | |
|---|---|---|---|
| 5,199,834 | 4/1993 | Seidl et al. | 411/5 |
| 5,207,544 | 5/1993 | Yamamoto et al. | 411/348 |
| 5,338,060 | 8/1994 | Soderquist | 280/728.2 |
| 5,409,256 | 4/1995 | Gordon et al. | 280/728.2 |
| 5,435,594 | 7/1995 | Gille | 280/728.2 |
| 5,527,064 | 6/1996 | Kai et al. | 280/728.2 |
| 5,556,125 | 9/1996 | Ricks et al. | 280/728.2 |

*Primary Examiner*—Kenneth R. Rice
*Attorney, Agent, or Firm*—Trexler, Bushnell, Giangiorgi & Blackstone, Ltd.

[57] ABSTRACT

A fastening assembly for mounting an inflatable module on a vehicle includes a support structure arranged for securing the inflatable module to a vehicle component, for example, a steering wheel hub or the like, and a first coupling member carried by the support structure and being flexible to accommodate any misalignment for ease of assembly; a second coupling component is adapted to be carried by the vehicle component and one of the first and second coupling components includes an aperture to receive a tongue member on the other coupling component to cooperate in snap-fit locking engagement which secures fastening of the module to the vehicle component.

33 Claims, 3 Drawing Sheets

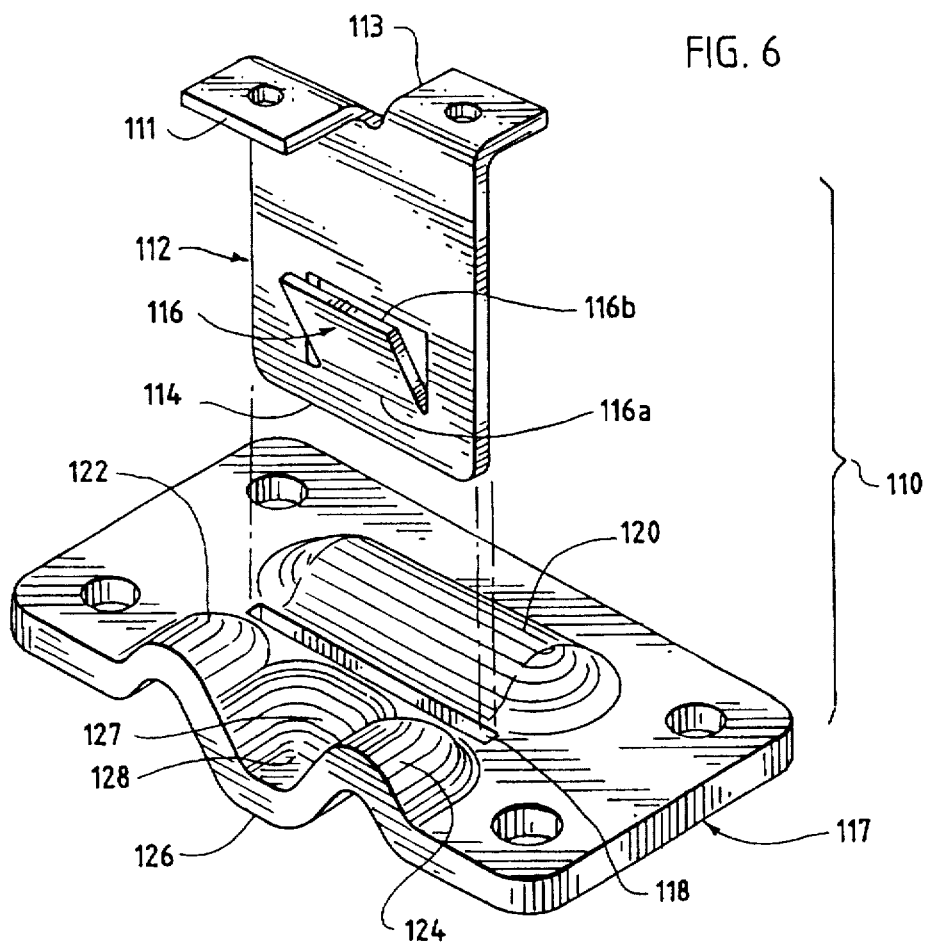
FIG. 6
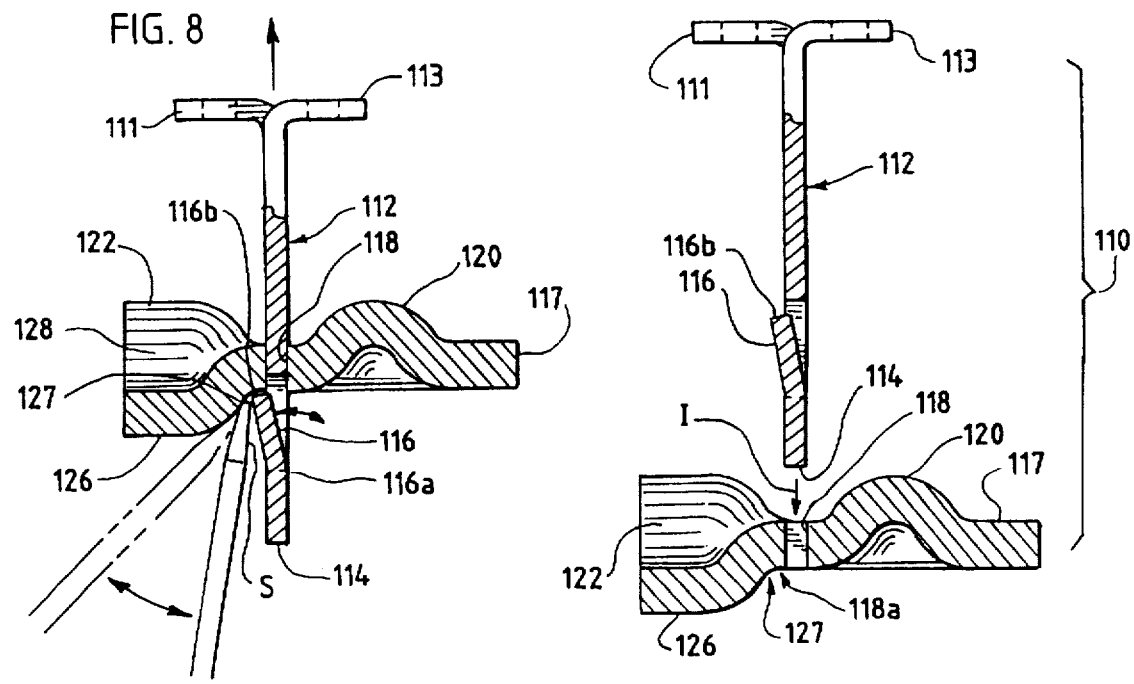
FIG. 8
FIG. 7

SPRING RETAINER AIR BAG MOUNTING DEVICE

CROSS-REFERENCE TO RELATED APPLICATION

This application is a Continuation-in-Part of our prior application Ser. No. 08/505,399, filed Jul. 21, 1995, now U.S. Pat. No. 5,599,039.

BACKGROUND

This invention relates to fastening assemblies for mounting protective modules containing inflatable restraint bags in passenger vehicles, and more particularly relates to rapid, push-in securement of the module without need for handling of separate fasteners and tools.

Preassembled, inflatable, "air bag" modules are typically delivered to vehicle manufacturers and then mounted as a unit to a vehicle component such as a steering wheel, dashboard or side door, along the vehicle assembly line. U.S. Pat. No. 5,005,860 describes an air bag mounting arrangement using spring claws to stabilize positioning of the air bag housing prior to fastening the housing onto the steering wheel hub with screw fasteners. In the effort to eliminate conventional fastening tools and fasteners for mounting the air bag module, U.S. Pat. No. 5,333,897 describes use of spring-loaded, push-on couplers which have complex fabrication and construction. Improved simplicity in both manufacturing and assembly are achieved by the module fastening subject of the present invention.

The prior art designs require either the use of fasteners or specifically constructed components to attain engagement of the module with steering wheel hub or underlying struts. The purpose of the present invention is to provide for the snap fitting of the air bag housing module to the steering wheel utilizing an arrangement that can be fabricated readily and without use of expensive components.

SUMMARY OF THE INVENTION

In accordance with the present invention, a fastening assembly for mounting an inflatable module on a vehicle includes a support structure arranged for securing the inflatable module to a vehicle component, for example, a steering wheel hub or the like, and a first coupling member carried by the support structure and being flexible to accommodate any misalignment for ease of assembly; a second coupling component is adapted to be carried by the vehicle component and one of the first and second coupling components includes an aperture to receive a tongue member on the other coupling component to cooperate in snap-fit locking engagement which secures fastening of the module to the vehicle component. Insertable into the coupling aperture is a further coupling element which is secured to the vehicle component, with the insertion securing and fastening the module to the vehicle component.

In the one embodiment of the invention, the first coupling component includes a resilient arm having a cam-following portion arranged for camming engagement against a coupling tongue on the vehicle component so that the camming engagement produces deflection of the coupling arm until the coupling aperture reversely deflects in snap-action bringing insertion of the tongue therethrough into a wedged, locking position which prevents withdrawal of the inflatable module in the mounted position, for example in the steering wheel hub. This engagement in combination with the resilient mounting of the module to the underlying vehicle structure will secure the module in place.

In a second embodiment of the fastening assembly, the second coupling component has a through slot defining the aperture through which a tongue member and locking tab on the first coupling component is received in snap-fit locking engagement. The locking tab is integrally hinged to the tongue member to enable reversible deflection of the locking tab allowing disengagement of the snap-fit locking engagement for convenient removal of inflatable module from the vehicle component.

BRIEF DESCRIPTION OF THE DRAWINGS

FIG. 6 is a perspective view of a second embodiment in accordance with the present invention prior to securement, which is similarly suitable for rapid mounting of an inflatable restraint bag module on a steering wheel hub as represented in FIG. 1;

FIG. 7 is a sectional view of the fastening assembly shown in FIG. 6; and

FIG. 8 is a sectional view of the assembled fastening assembly shown in FIGS. 6 and 7, showing a diagrammatic view to initiate disassembly using a lever tool.

DESCRIPTION OF THE PREFERRED EMBODIMENTS

Figure 1:
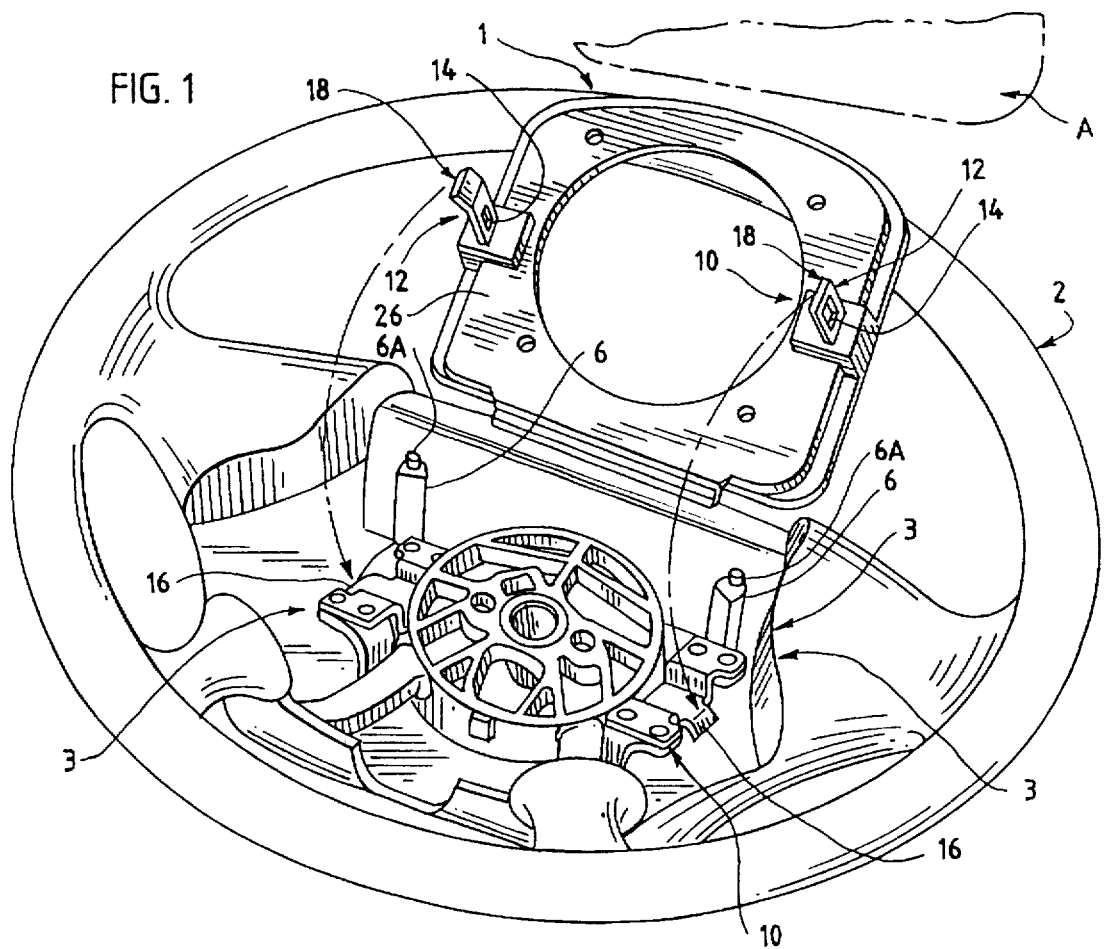
FIG. 1 is a perspective view of one embodiment of a fastening assembly prior to securement in accordance with the present invention, illustrating an inflatable restraint bag and housing module to be mounted on the hub of a vehicle steering wheel.
Figure 2:
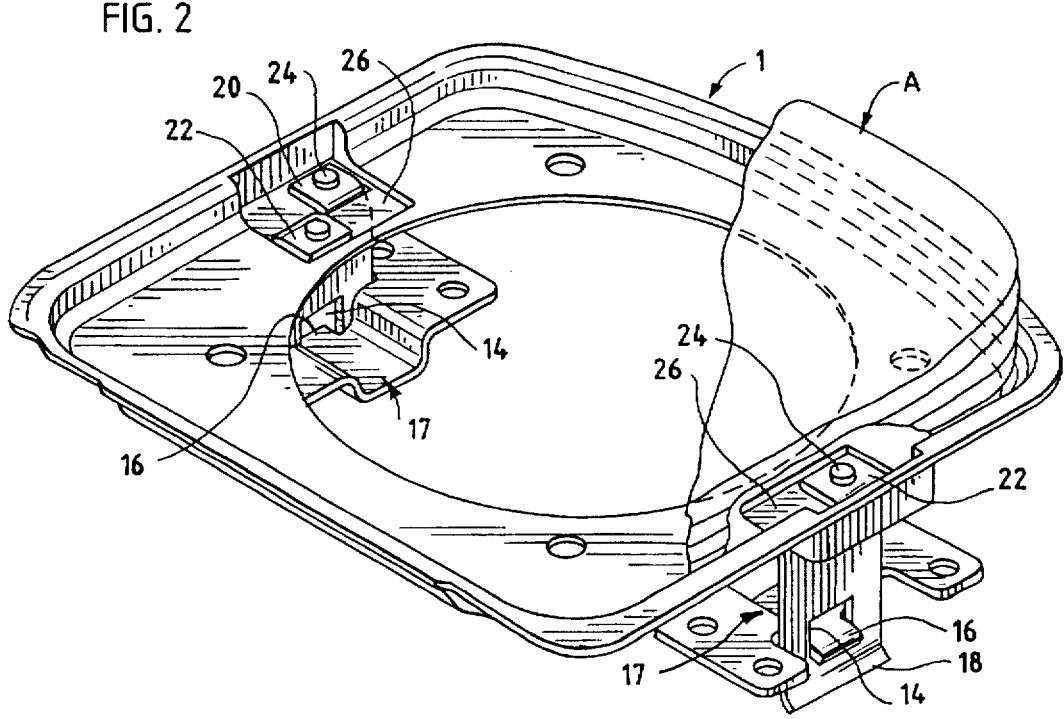
FIG. 2 is a perspective view of the secured fastening assembly shown in FIG. 1 in which the housing is partially fragmentary and the securing wheel hub has been omitted for clarity of the fastening assembly.

Referring initially to FIGS. 1 and 2, an embodiment of the fastening assembly 10 in accordance with the present invention is illustrated for securing a modular housing 1 for an inflatable, restraint bag A to a vehicle steering wheel construction 2. In this regard, it should be noted that the steering wheel construction 2, includes two pairs of mounting pillars 6 (only one pair shown) which include resilient stops 6A. The module housing 1 is supported upon the mounting holes 6 and the stops 6A provided a resilient biasing. It should be noted that the fastening assembly 10 could also be employed for securing the bag module housing 1 to other vehicle components, for example, a dashboard or a side door, and therefore the fastening assembly according to the present invention is versatilely employable particularly in any application where a "push-in" securement is desirable to eliminate need for access panels or separate fasteners and tools.

Figure 3:
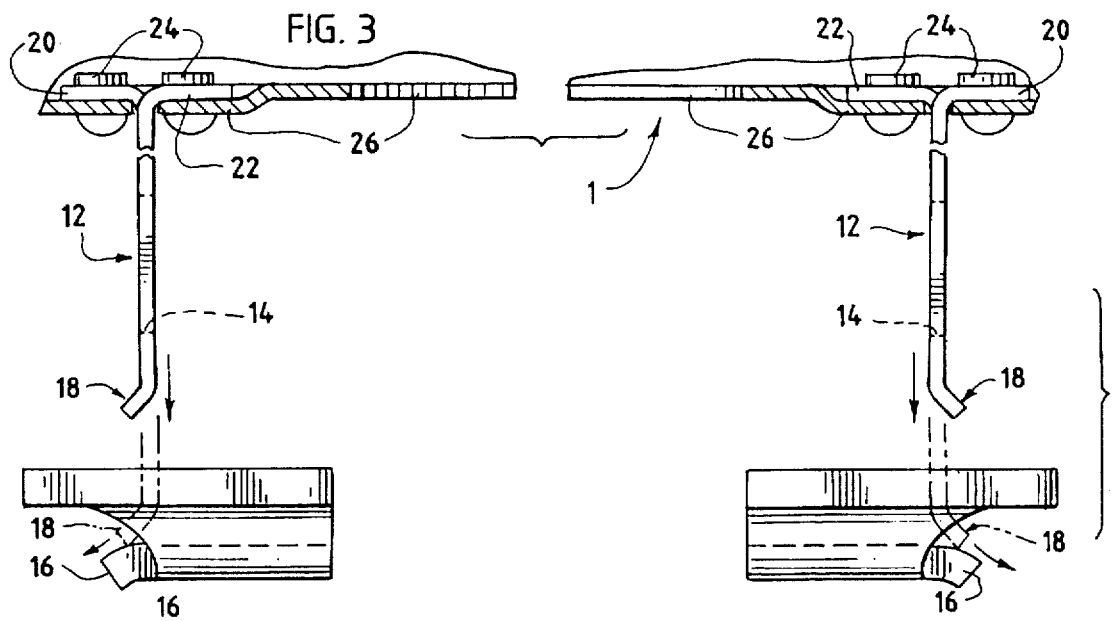
FIGS. 3–5 are partially sectional views illustrating sequential progression in coupling of the fastening assembly shown in FIGS. 1 and 2.

As shown in FIG. 1 which illustrates the fastening assembly or system prior to securement, the fastening assembly includes at least a pair of spaced, coupling arms 12 mounted on the underside of the inflatable module housing 1. The coupling arms 12 are resilient and may be characterized as leaf-spring type arms. Referring particularly to FIGS. 2 and 3, each of the coupling arms 12 also has offset mounting flange portions 20,22 which are riveted at 24, or otherwise fixed to the underside housing panel 26 of the modular housing 1. The coupling arms 12 each have a coupling or locking aperture 14 which receives a respective locking tongue 16 projecting from a bracket 17 mounted in the hub portion 3 of the steering wheel 2. Each of the coupling arms 12 has a foot portion 18 forming the projecting end thereof, and axially spread from the aperture 14. Each foot portion 18 has been bent or defected outwardly to provide a camming surface, as will be explained more fully hereinafter.

Figure 4:
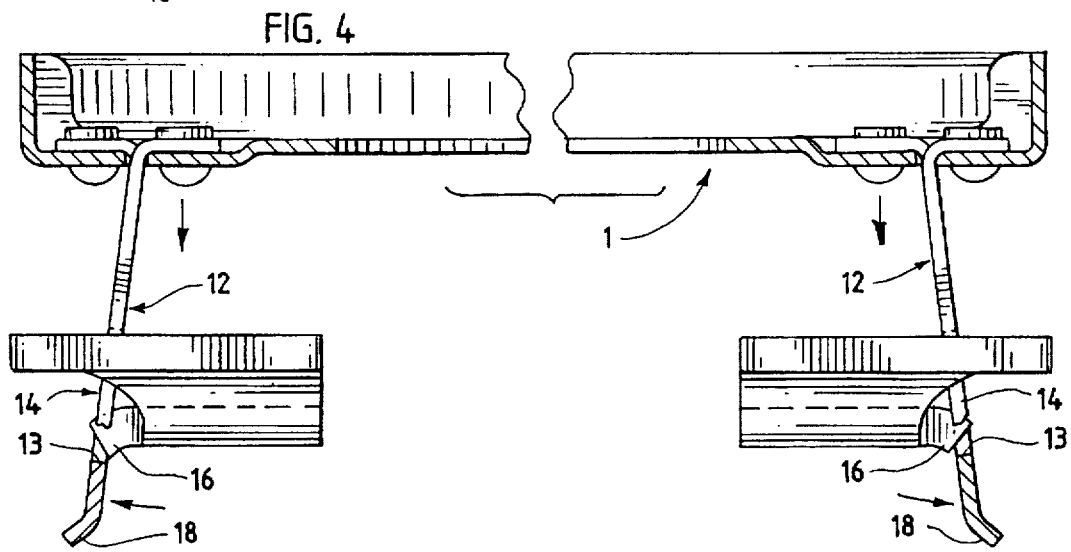
Figure 5:
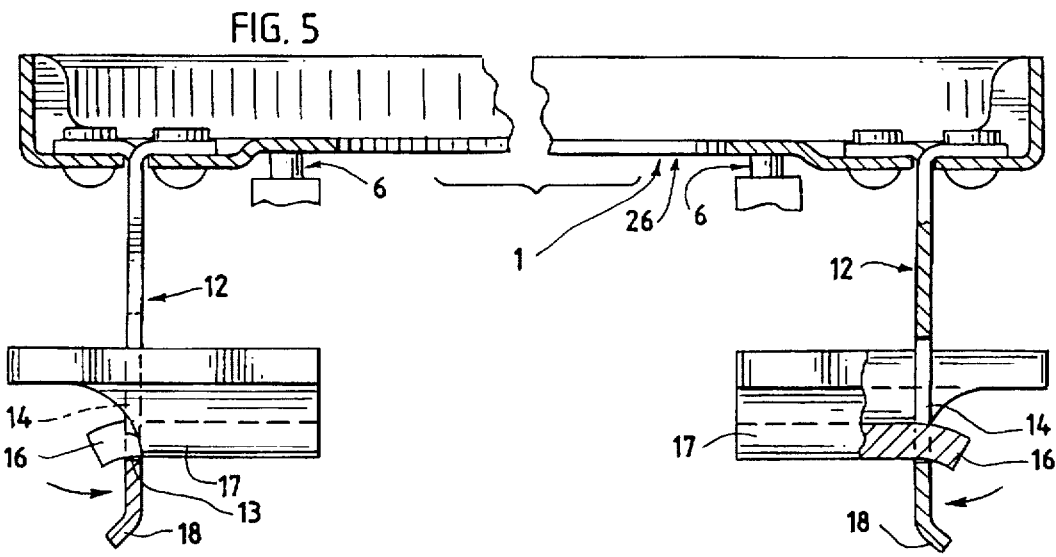

In initiating the mounting operation, as more fully described hereinafter, the bent feet 18 are generally aligned with the respective locking tongues 16 so that the coupling arms 12 need only be moved inwardly or downwardly to engage the feet 18 against the tongues 16. Referring again to FIG. 3, after initial alignment beginning the mounting operation, the bent feet 18,18 engage the respective tongues 16,16 and continued force on the module 1 causes the coupling arms 12 to deflect outwardly in a cam-action against the stationary tongues 16,16 as shown in the phantom positions of the feet 18 in FIG. 3. The progressive outwardly cammed deflection of the feet 18 with continued force on the module 1 brings the lower edge 13 of the coupling aperture 14 to the tongue 16 as shown in FIG. 4. With continued pushing as shown in FIG. 5, the disengagement of the lower aperture edge 13 from the tongue 16 allows the reactive spring-force of the outward deflection to produce a reverse, inward deflection of the arm 12 and aperture 14 to achieve insertion therethrough of the tongue 16 in snap-action arriving at the position in FIG. 5 in which the bottom aperture edge 13 has become wedged in locking engagement against the bottom surface of the tongue 16 generally where it meets the bracket 17. Thus, the arms 12 are initially sprung outwardly by the camming action of the tongues 16 on the portions 18, which are in effect cam followers. The resilient nature of the arms 12 allow said arms to spring back to their initial position once the tongues 16 are engaged in operation 14. Thereafter, the wedged locking of the arms 12 by the respective bracket tongues 16 prevents retraction of the module 1 from the hub brackets 17. Deliberate dismounting of the module 1 requires outward deflection of the arms, such as by tooling, in order to withdraw the tongues 16 from the respective coupling apertures 14.

Also as shown in the locked position of the module 1 in FIG. 5, the bottom module panel 26 is seated upon four resilient or rubber-tipped pillars or stops 6 (two shown) provided in the wheel hub 3 (FIG. 1) so that the module 1 cannot be pushed further into the hub 3 and is securely locked into the correctly mounted position as shown in FIG. 5. Thus, once the aperture 14 in arms 12 are engaged by the tongues 16, this engagement coupled with the resilient upwardly biasing force provided by the resilient pillars 6 maintains the module in position.

As illustrated, the secure fastening of the module 1 is shown mounted on the vehicle steering wheel hub, however, the locking tongues 16 and bracket 17 could be provided on a dashboard assembly or a side door assembly as well as any other suitable vehicle component in order to locate the inflatable, restraint bag A in other protective positions. Additionally, the fastening assembly of the present invention could be employed to secure other suitable types of equipment, particularly where rapid fastening without separate fasteners is important.

Referring now to FIGS. 6-8, a second embodiment of a fastening assembly 110 in accordance with the present invention is generally designated by reference character 110. FIG. 6 illustrates a resilient coupling arm 112 which has offset mounting flange portions 111 and 113 which can be riveted or otherwise fixed to the underside housing panel of the restraint bag module housing 1 shown in FIG. 1. A spaced pair of the resilient coupling arms 112 project downwardly from the modular housing panel in arrangement similar to the illustration in FIGS. 1 and 2 when the bag module is mounted in the vehicle steering wheel hub, although for simplicity only one of the coupling arms 112 and corresponding coupling bracket 117 are shown in FIGS. 6-8. The resilience of the coupling arms 112 enables angular tolerance in alignment and separate coupling to the respective bracket 117 rather than requiring the assembler to attain precise alignment and simultaneously couple two or more coupling assemblies as in prior art coupling designs.

The resilient coupling arm 112 has a transversely elongate, distal end 114 which is inserted through a corresponding elongate receptive slot 118 formed through the bracket 117 which is mounted on the vehicle component, typically the steering wheel hub (not shown). In order to guide the distal end 114 into alignment for insertion through the slot 118, the slot 118 is flanked by guide protuberances formed on the bracket 117; in the illustrated embodiment, one of the guide protuberances 120 is fabricated for example by deforming or otherwise upsetting an extended lobe 120 having elongate dimension approximating the elongate dimension of the slot 118; on the opposite side of the slot, two spaced, upwardly projecting lobes 122 and 124 are arranged laterally adjacent to opposite ends of the through slot 118 and a downwardly protruding lobe 126 is a oppositely punched or otherwise fabricated on the bracket 117 to leave a cavity generally designated 128 formed between the spaced lobes 122 and 124 and disposed on the same side of the slot therewith.

While the spaced lobes 122 and 124 could be replaced by a single, continuous lobe formed to mirror the elongate lobe 120, such modification would be less preferable to the illustrated embodiment when a downwardly or in a protuberance is to be otherwise fabricated since this would generally necessitate attachment or other fabrication of a separate member in substitution for the simplified punching of the lobe 126 in illustrated embodiment to serve as a fulcrum as more fully explained hereinafter.

Referring again to FIG. 6, a spring locking tab 116 is struck out from the coupling arm 112 but pivotally hinged along a connecting, side portion 116a of the tab 116 which remain integral with the arm 112. The integral side or hinge portion 116a is oriented generally parallel to and spaced from the arm end 114 so that the oppositely struck free edge 116b of the tab is laterally displaced from the general plane of the arm 112 prior to assembly with a fastener system 110. In initiating the mounting operation, the flexibility of the two coupling arms 112 enables individual alignment and partial or complete insertion of the coupling arm 112 through the coupling slot 118 and the bracket 117. As the spring locking tab 116 is guided and passes through the slot 118, the slot surfaces force deflection of the hinged spring tab 116 into general planar alignment with the surrounding arm 112 until the free side edge 116b of the tab clears the bottom of the slot as shown in FIG. 8, at which time the released tab 116 springs back to the previous, biased laterally deflected position in "snap-action" so that the free edge 116b lodges securely in wedged position beneath the bottom, side edge 118a of the slot 118, and the tab edge 116b is locked thereagainst to prevent retraction of the arm 112 and secure the assembled fastening thereof to the bracket 117.

The "snap-action" lock of the tab edge 116b into the wedged position shown in FIG. 8 provides a particularly tactile feedback to the assembler to indicate the positive engagement of the secured coupling, as well as a highly audible percussion of the snap-action impact which augments indication of the completed coupling assembly, so that the assembler may then shift his attention to the separate snap-action coupling insertion of one or more resilient arms and locking tabs for flexibility in completing the mounting attachment of the air bag or other module 1.

Referring again to FIG. 8, in the event that dismounting of the air bag module 1 becomes needed, the downwardly protruding lobe 126 provides a convenient fulcrum surface 127 adjacent to the wedged and locked position of the locking tab edge 116b allowing convenient use of a blade screwdriver S, or other suitable tool accessed through an opening in the steering wheel hub to support pivot of the tool against the locking tab 116 to force reversal of the bias of the tab 116 into return to sufficient alignment with the main arm 112 to permit unlocking and withdrawal of the arm 112 back through the slot 118 in retraction motion reverse to the direction of insertion indicated by arrow I in FIG. 7. In addition to providing a fulcrum surface 127, the downwardly protruding lobe 126 also prevents the locking tab 116 from any excessive lateral deflection which could tend to allow folding of the tab 116 back on itself producing weakening of the locking and securement of the arm 112 within the bracket 117.

While a preferred embodiment of the present invention is shown and described, it is envisioned that those skilled in the art may devise various modifications and equivalents without departing from the spirit and scope of the appended claims.

The invention claimed is:

1. A fastening assembly for mounting an inflatable module on a vehicle comprising: a support structure arranged for securing the inflatable module to a vehicle component or the like; a coupling member projecting from said support structure and having a coupling aperture; and a coupling element securable to said vehicle component, and arranged for coupling insertion into said coupling aperture to secure fastening of said module to said vehicle component.

2. A fastening assembly according to claim 1, wherein said coupling member comprises a cam-following portion thereof arranged for camming engagement against said coupling element prior to insertion thereof into said coupling aperture.

3. A fastening assembly according to claim 2, wherein said camming engagement produces deflection of said coupling member.

4. A fastening assembly according to claim 3, wherein said coupling aperture is arranged for insertion therein of said coupling tongue upon termination of said camming engagement.

5. A fastening assembly according to claim 4, wherein said camming engagement termination enables reverse deflection of said coupling member relative to said camming deflection thereof.

6. A fastening assembly according to claim 1, wherein said cam-following portion comprises a bent portion of said coupling member.

7. A fastening assembly according to claim 6, wherein said coupling element comprises a tongue portion thereof having a conforming inclination relative to said bent, cam-following portion of said coupling member.

8. A fastening assembly according to claim 2, wherein said coupling member has one end thereof fixed to said support structure and a second end thereof defining said cam-following portion and said coupling aperture medially arranged between said first and second ends.

9. A fastening assembly according to claim 1, wherein said coupling element comprises a tongue portion projecting from a mounting bracket securable to said vehicle component.

10. A fastening assembly according to claim 2, wherein said coupling aperture is movable relative to said coupling element during said coupling insertion.

11. A fastening assembly according to claim 10, wherein said coupling aperture movement comprises snap-action thereof relative to said coupling element.

12. A fastening assembly according to claim 1, wherein said coupling aperture is formed through said coupling member enabling coupling insertion of said coupling element therethrough.

13. A fastening assembly according to claim 1, wherein said coupling element is wedged against a peripheral surface of said coupling aperture in locked relative positions thereof defining said secure module fastening.

14. A fastening assembly according to claim 1 further including resilient support member engaging said module to bias said module in a direction opposite that employed in assembly thereof to said vehicle component.

15. A fastening assembly for mounting an inflatable module to a vehicle, comprising: a support structure for the inflatable module which support structure will be mounted to a vehicle structure, said fastener assembly comprising a first coupling component carried by said support structure and being flexible to accommodate any misalignment and to facilitate assembly, a second coupling component adapted to be carried by the vehicle structure, said first and second coupling components being engageable with a snap-fit locking engagement, one of said components including an aperture and the other of said components a tongue member disposable in said aperture to attain said snap-fit locking engagement.

16. A fastening assembly according to claim 15, wherein said first coupling component comprises said tongue member and said second coupling member comprises said aperture.

17. A fastening assembly according to claim 16, wherein said second coupling component comprises a through slot defining said aperture through which said tongue member on the first coupling component is received in said snap-fit locking engagement.

18. A fastening assembly according to claim 16, wherein said second coupling component further comprises guide structure arranged to enable guidance of said tongue member into alignment for insertion through said aperture.

19. A fastening assembly according to claim 18, wherein said aperture comprises an elongate slot.

20. A fastening assembly according to claim 19, wherein said guide structure comprises a protuberance projecting from said second coupling component, said protuberance arranged to deflect said tongue member toward insertion into said slot.

21. A fastening assembly according to claim 20, wherein said protuberance includes an elongate dimension oriented in parallel relationship to said elongate slot.

22. A fastening assembly according to claim 19, wherein said tongue member includes an elongate dimension insertable through said elongate slot, said elongate dimension approximating a corresponding length of a protuberance formed on said second coupling member adjacent said slot to define said guide structure.

23. A fastening assembly according to claim 15, wherein said tongue member includes a generally flat panel and a locking tab laterally projecting therefrom.

24. A fastening assembly according to claim 23, wherein said locking tab is laterally deflectable relative to said panel.

25. A fastening assembly according to claim 24, wherein said locking tab is integrally hinged to said panel to enable reversible deflection toward or away from said panel.

26. A fastening assembly according to claim 25, wherein said locking tab is insertable through said aperture.

27. A fastening assembly according to claim 26, wherein said locking tab is resiliently biased to lateral extension from said panel to enable said snap-fit locking engagement against said second coupling member following passage of said locking tab through said slot.

28. A fastening assembly according to claim 16, wherein said second coupling component comprises a first guide structure and a second guide structure in which said aperture is medially arranged therebetween to enable said first and second guide structures to provide guidance of said tongue member into alignment for insertion through said aperture.

29. A fastening assembly according to claim 16, further comprising fulcrum support structure arranged adjacent to said aperture to enable support of a tool thereagainst for displacement thereby of said tongue member to force disengagement thereof from said snap-fit locking engagement.

30. A fastening assembly according to claim 29, wherein said support fulcrum structure comprises a fulcrum protuberance projecting from said second coupling component adjacent to said aperture.

31. A fastening assembly according to claim 30, wherein said fulcrum protuberance is positioned adjacent to a portion of said tongue member projecting from said aperture in said snap-fit locking engagement for positioning of said tool against said tongue to force said disengagement thereof.

32. A fastening assembly according to claim 31, wherein said tongue member includes a generally flat panel and a locking tab laterally projecting therefrom adjacently toward said fulcrum support protuberance.

33. A fastening assembly according to claim 32, wherein said locking tab is resiliently biased to lateral extension from said panel to enable said snap-fit locking engagement against said second coupling member following passage of said locking tab through said aperture, said fulcrum support protuberance being positioned adjacently spaced from said resiliently biased lateral extension of said locking tab to support an inserted tool therebetween to enable displacement of said locking tab from said lateral extension into sufficient alignment with said panel to unlock said snap-fit engagement and enable reverse passage of said locking tab through said slot for withdrawal of said tongue member from said second coupling component allowing dismounting of said module from said vehicle.

* * * * *